(12) United States Patent
Moura, III et al.

(10) Patent No.: US 10,816,206 B2
(45) Date of Patent: Oct. 27, 2020

(54) GAS TURBINE ENGINE QUENCH PATTERN FOR GAS TURBINE ENGINE COMBUSTOR

(71) Applicant: United Technologies Corporation, Farmington, CT (US)

(72) Inventors: Dennis M. Moura, III, South Windsor, CT (US); Reza Rezvani, Manchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 537 days.

(21) Appl. No.: 15/025,808

(22) PCT Filed: Oct. 20, 2014

(86) PCT No.: PCT/US2014/613710
§ 371 (c)(1),
(2) Date: Mar. 29, 2016

(87) PCT Pub. No.: WO2015/102736
PCT Pub. Date: Jul. 9, 2015

(65) Prior Publication Data
US 2016/0245521 A1    Aug. 25, 2016

Related U.S. Application Data

(60) Provisional application No. 61/895,189, filed on Oct. 24, 2013.

(51) Int. Cl.
*F23R 3/14* (2006.01)
*F23R 3/50* (2006.01)
*F23R 3/06* (2006.01)
*F02C 3/00* (2006.01)
*F23R 3/28* (2006.01)

(52) U.S. Cl.
CPC .................. *F23R 3/14* (2013.01); *F02C 3/00* (2013.01); *F23R 3/06* (2013.01); *F23R 3/283* (2013.01); *F23R 3/50* (2013.01); *Y02T 50/675* (2013.01)

(58) Field of Classification Search
CPC .... F23R 3/14; F23R 3/06; F23R 3/283; F23R 3/286
See application file for complete search history.

(56) References Cited

U.S. PATENT DOCUMENTS 6,260,359 B1 * 7/2001 Monty .................... F23R 3/06
60/732
6,543,233 B2    4/2003 Young et al.
(Continued)

OTHER PUBLICATIONS

EP search report for EP14875988.9 dated Nov. 21, 2016.

*Primary Examiner* — Todd E Manhan
*Assistant Examiner* — Katheryn A Malatek
(74) *Attorney, Agent, or Firm* — Getz Balich LLC (57) ABSTRACT

A combustor for a turbine engine includes an inner liner panel with a multiple of inner dilution passages. The multiple of dilution passages includes a repeating pattern of a first major inner air passage, a minor inner air passage, and a second major inner air passage. A combustor for a turbine engine includes an outer liner panel with a multiple of outer dilution passages. The multiple of outer dilution passages includes a repeating pattern of a first major outer air passage, a first minor outer air passage, a second major outer air passage, and a second minor outer air passage.

13 Claims, 8 Drawing Sheets

(56) References Cited

U.S. PATENT DOCUMENTS

| | | |
|---|---|---|
| 6,606,861 B2 | 8/2003 | Snyder |
| 6,629,415 B2 | 10/2003 | Howard et al. |
| 6,675,587 B2 * | 1/2004 | Graves .................. F23R 3/04 60/748 |
| 6,810,673 B2 | 11/2004 | Snyder |
| 7,000,400 B2 | 2/2006 | Schumacher et al. |
| 7,086,232 B2 | 8/2006 | Moertle et al. |
| 7,124,588 B2 | 10/2006 | Gerendas et al. |
| 7,155,913 B2 | 1/2007 | Beule et al. |
| 7,509,809 B2 | 3/2009 | Patel et al. |
| 7,546,743 B2 | 6/2009 | Bulman et al. |
| 7,549,350 B2 | 6/2009 | Graze, Jr. |
| 7,874,159 B2 | 1/2011 | Gerendas et al. |
| 7,895,841 B2 | 3/2011 | Johnson et al. |
| 7,900,457 B2 | 3/2011 | Patterson et al. |
| 7,926,278 B2 | 4/2011 | Gerendas et al. |
| 7,926,284 B2 | 4/2011 | Zupanc et al. |
| 7,942,005 B2 | 5/2011 | Bessagnet et al. |
| 8,056,342 B2 | 11/2011 | Shelley et al. |
| 2006/0130486 A1 | 6/2006 | Danis et al. |
| 2008/0010992 A1 * | 1/2008 | Patterson .................. F23R 3/06 60/772 |
| 2009/0308077 A1 | 12/2009 | Shelley et al. |
| 2011/0048024 A1 | 3/2011 | Snyder et al. |
| 2011/0126543 A1 | 6/2011 | Kirsopp et al. |
| 2013/0025293 A1 | 1/2013 | Kim et al. |
| 2015/0285500 A1 | 10/2015 | Bourgois et al. |

* cited by examiner

GAS TURBINE ENGINE QUENCH PATTERN FOR GAS TURBINE ENGINE COMBUSTOR

CROSS-REFERENCE TO RELATED APPLICATION

This application claims priority to PCT Patent Application No. PCT/US14/61371 filed Oct. 20, 2014, which claims priority to U.S. Provisional Application Ser. No. 61/895,189 filed Oct. 24, 2013, which are hereby incorporated herein by reference in their entireties.

BACKGROUND

The present disclosure relates to a gas turbine engine and, more particularly, to a combustor section therefor.

Gas turbine engines such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section generally includes radially spaced apart inner and outer wall assemblies that define an annular combustion chamber therebetween. Arrays of circumferentially distributed air passages radially admit pressurized air into the combustion chamber and a plurality of circumferentially distributed fuel injectors axially project into a forward section of the combustion chamber to supply the fuel for mixture with the pressurized air.

Combustion of the hydrocarbon fuel with the pressurized air may produce nitrogen oxide (NO.sub.X) emissions that are subjected to excessively stringent controls by regulatory authorities, and thus are sought to be minimized as much as possible.

At least one known strategy for minimizing NO.sub.X emissions is referred to as rich burn, quick quench, lean burn (RQL) combustion. The RQL strategy recognizes that the conditions for NO.sub.X formation are most favorable at elevated combustion flame temperatures, such as, for example, when a fuel-air ratio is at or near stoichiometric. A combustor configured for RQL combustion typically includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. Although the resulting stoichiometrically fuel rich fuel-air mixture is ignited and burned to partially release the energy content of the fuel, NO.sub.X formation may still occur.

The fuel rich combustion products then enter the quench zone where jets of pressurized air radially enter into the quench zone. The pressurized air mixes with the combustion products to support further combustion and progressive derichment of the fuel rich combustion products as they flow axially through the combustion chamber. Initially, the fuel-air ratio of the combustion products changes from fuel rich to stoichiometric, with an attendant rise in the combustion flame temperature. Since the quantity of NO.sub.X produced in a given time interval may increase exponentially with flame temperature, quantities of NO.sub.X may be produced during the initial quench process. As the quenching continues, the fuel-air ratio of the combustion products changes from stoichiometric to fuel lean, with an attendant reduction in the flame temperature. However, until the mixture is diluted to a fuel-air ratio substantially lower than stoichiometric, the flame temperature remains high enough and may generate NO.sub.X.

Finally, the deriched combustion products from the quench zone flow axially into the lean burn zone. Additional pressurized air in this zone supports ongoing combustion to release energy from the fuel. The additional pressurized air in this zone also regulates the peak temperature and spatial temperature profile of the combustion products to reduce turbine exposure to excessive temperatures and excessive temperature gradients.

SUMMARY

A combustor for a turbine engine, according to one disclosed non-limiting embodiment of the present disclosure, includes an inner liner panel with a multiple of inner dilution passages. The multiple of dilution passages include a repeating pattern of a first major inner air passage, a minor inner air passage, and a second major inner air passage. The second major inner air passage is larger than the first major inner air passage.

In a further embodiment of the present disclosure, the first major inner air passage is located at about ¼ pitch.

In a further embodiment of the present disclosure, the first major inner air passage is located at about ¼ pitch. The minor inner air passage is located at about ½ pitch. The second major inner air passage is defined at ¾ pitch with respect to each of a multiple of swirlers.

In a further embodiment of any of the foregoing embodiments of the present disclosure, the first major inner air passage is located at about ¼ pitch. The minor inner air passage is located at about ½ pitch. The second major inner air passage is defined at ¾ pitch. The second major inner air passage is larger than the first major inner air passage.

In a further embodiment of any of the foregoing embodiments of the present disclosure, an outer liner panel is included with a multiple of outer dilution passages opposite the inner liner panel. The multiple of outer dilution passages includes a repeating pattern of a first major outer air passage, a first minor outer air passage, a second major outer air passage, and a second minor outer air passage.

In a further embodiment of any of the foregoing embodiments of the present disclosure, the first major outer air passage is located at about zero (0) pitch. The first minor outer air passage is located at about ¼ pitch. The second major outer air passage is located at about ½ pitch. The second minor outer air passage is defined at ¾ pitch.

In a further embodiment of any of the foregoing embodiments of the present disclosure, the multiple of outer dilution passages are clocked with respect to an upstream swirler.

In a further embodiment of any of the foregoing embodiments of the present disclosure, the multiple of outer dilution passages are clocked with respect to an upstream swirler by about one (1) degree.

In a further embodiment of any of the foregoing embodiments of the present disclosure, the multiple of outer dilution passages are clocked in a direction opposite to a direction a swirl provided by the upstream swirler.

In a further embodiment of any of the foregoing embodiments of the present disclosure, the second major outer air passage is clocked with respect to an upstream swirler.

In a further embodiment of any of the foregoing embodiments of the present disclosure, the multiple of outer dilution passages define an area larger than the multiple of inner dilution passages.

A combustor for a turbine engine, according to another disclosed non-limiting embodiment of the present disclosure, includes an outer liner panel with a multiple of outer dilution passages. The multiple of outer dilution passages includes a repeating pattern of a first major outer air passage, a first minor outer air passage, a second major outer air passage, and a second minor outer air passage.

In a further embodiment of any of the foregoing embodiments of the present disclosure, the repeating pattern is clocked with respect to each of a multiple of respective upstream swirlers.

In a further embodiment of any of the foregoing embodiments of the present disclosure, the first major outer air passage is located at about zero (0) pitch. The first minor outer air passage is located at about ¼ pitch. The second major outer air passage is located at about ½ pitch. The second minor outer air passage is defined at ¾ pitch.

In a further embodiment of any of the foregoing embodiments of the present disclosure, the multiple of outer dilution passages are clocked with respect to an upstream swirler by about one (1) degree.

In a further embodiment of any of the foregoing embodiments of the present disclosure, the multiple of outer dilution passages are clocked in a direction opposite to a direction a swirl provided by the upstream swirler.

In a further embodiment of any of the foregoing embodiments of the present disclosure, the first major outer air passage and/or the second major outer air passage are larger than the first minor outer air passage and/or the second minor outer air passage.

In a further embodiment of any of the foregoing embodiments of the present disclosure, the second major outer air passage is larger than the first major outer air passage. The first minor outer air passage and the second minor outer air passage are about equal in size.

In a further embodiment of any of the foregoing embodiments of the present disclosure, an inner liner panel is included with a multiple of inner dilution passages opposite the outer liner panel. The multiple of dilution passages includes a repeating pattern of a first major inner air passage, a minor inner air passage, and a second major inner air passage. The multiple of outer dilution passages define an area larger than the multiple of inner dilution passages.

In a further embodiment of any of the foregoing embodiments of the present disclosure, the first major inner air passage is located at about ¼ pitch. The minor inner air passage is located at about ½ pitch. The second major inner air passage is defined at ¾ pitch. The second major inner air passage larger than the first major inner air passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
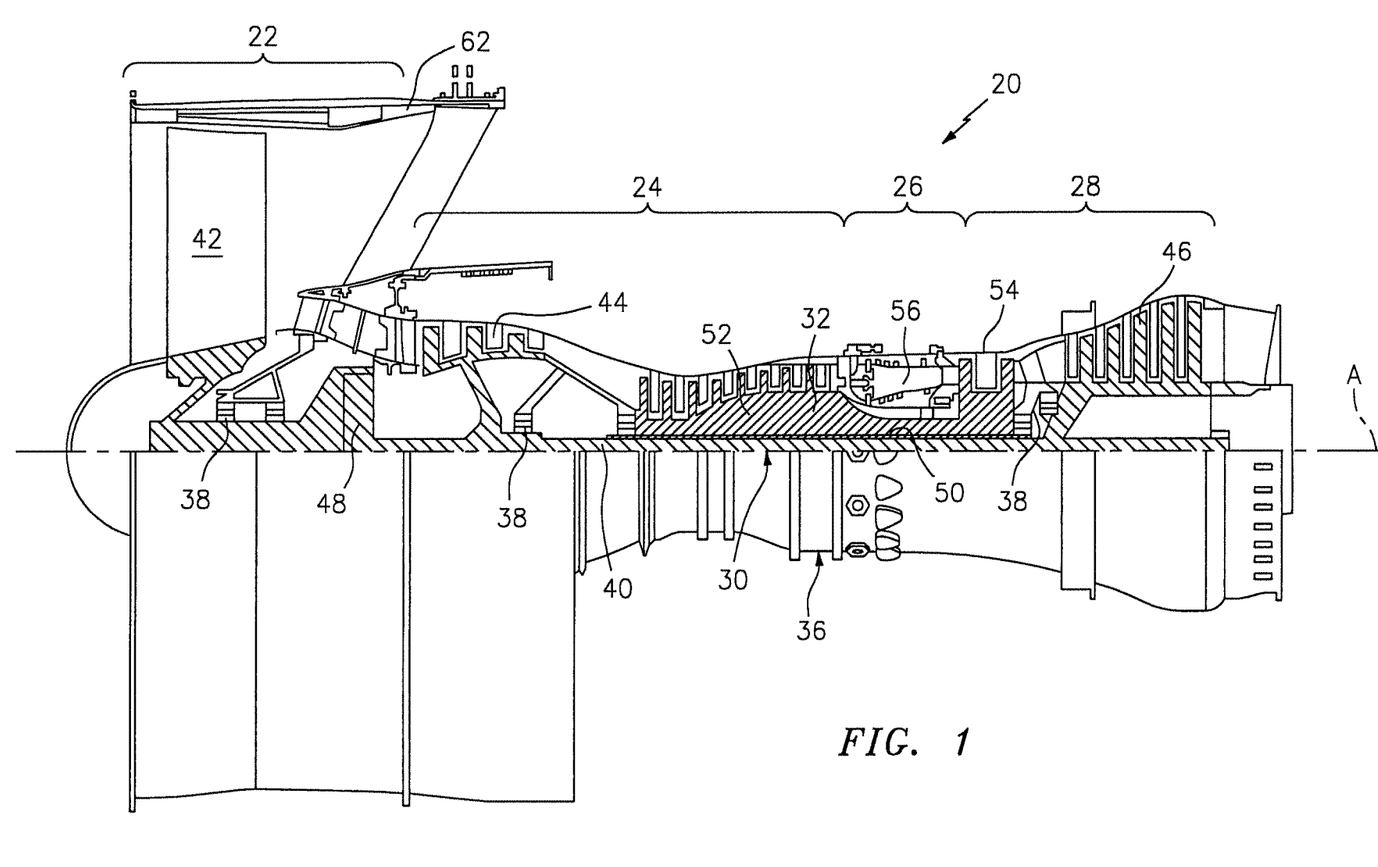
FIG. 1 is a schematic cross-section of an example gas turbine engine architecture.
Figure 2:
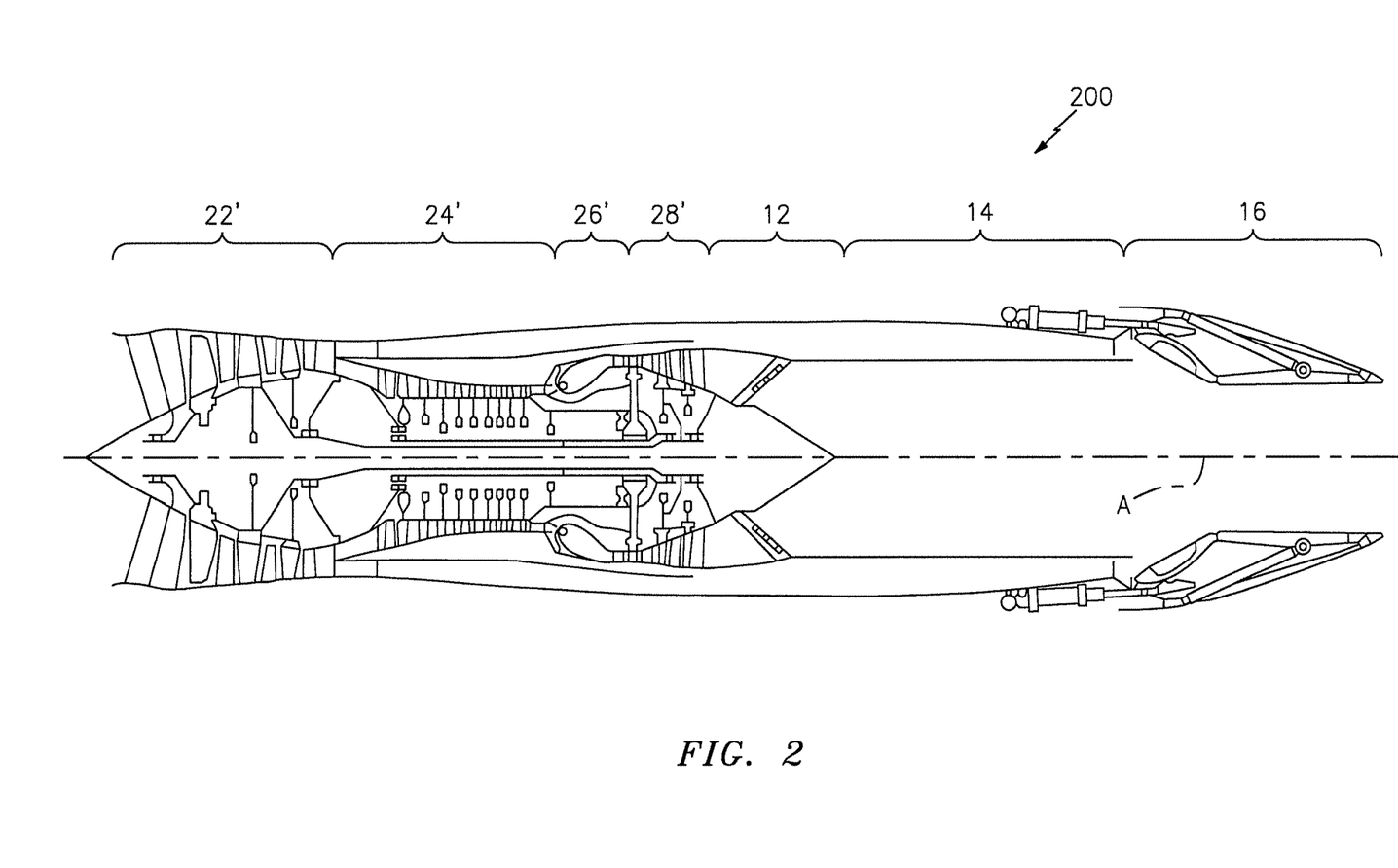
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and an injector section 16 in addition to the fan section 22', compressor section 24', combustor section 26' and turbine section 28' (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 (see FIG. 1) to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by the bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 may be pressure measured prior to the inlet of the LPT 46 as related to the pressure at the outlet of the LPT 46 prior to an exhaust injector of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
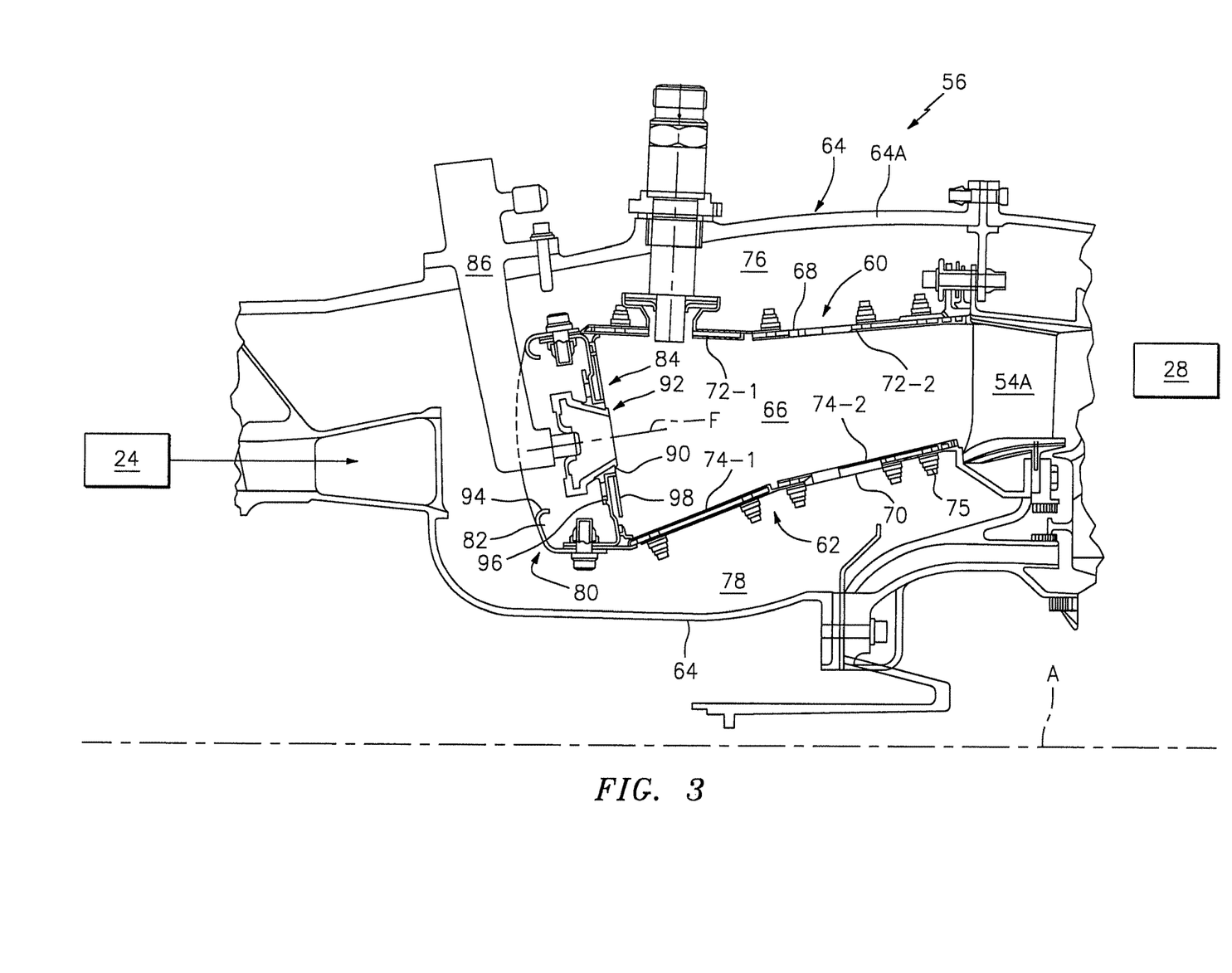
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape.

The outer combustor wall 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor architecture is illustrated, other combustor types with various combustor liner arrangements will also benefit herefrom.

The combustor wall assemblies 60, 62 contain the combustion products for direction toward the turbine section 28. Each combustor wall 60, 62 generally includes a respective support shell 68, 70 which supports one or more liner panels 72, 74 mounted thereto. Each of the liner panels 72, 74 may be generally arcuate with a rectilinear cross section and manufactured of for example, a nickel based super alloy, ceramic or other temperature resistant material and are arranged to form a liner array. In one disclosed non-limiting embodiment, the liner array includes a multiple of forward liner panels 72-1 and a multiple of aft liner panels 72-2 that are circumferentially staggered to line the outer shell 68. A multiple of forward liner panels 74-1 and a multiple of aft liner panels 74-2 are circumferentially staggered to line the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, and a multiple of swirlers 90 (one shown). The swirlers 90 are circumferentially aligned with respective outlets of a multiple of fuel injectors 86 (one shown) along an axis F.

The bulkhead assembly 84 generally includes a bulkhead support shell 96 secured to the combustor wall assemblies 60, 62, and a multiple of circumferentially distributed bulkhead liner panels 98 secured to the bulkhead support shell 96 around the swirler opening 92. The bulkhead support shell 96 is generally annular and the multiple of circumferentially distributed bulkhead liner panels 98 are segmented, typically one to each fuel injector 86 and swirler 90.

The annular hood 82 extends radially between, and is secured to, the forwardmost ends of the combustor wall assemblies 60, 62. The annular hood 82 includes the multiple of circumferentially distributed hood ports 94 that receive one of the respective multiple of fuel injectors 86 to facilitate the direction of compressed air into the forward end of the combustion chamber 66 through the respective swirler 90. Each fuel injector 86 may be secured to the diffuser case module 64 and project through an associated hood port 94.

The forward assembly 80 introduces core combustion air into the forward section of the combustion chamber 66 while the remainder enters the outer annular plenum 76 and the inner annular plenum 78. The multiple of fuel injectors 86 and adjacent structure generate a fuel-air mixture that supports stable combustion in the combustion chamber 66.

Opposite the forward assembly 80, the outer and inner support shells 68, 70 are mounted adjacent a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
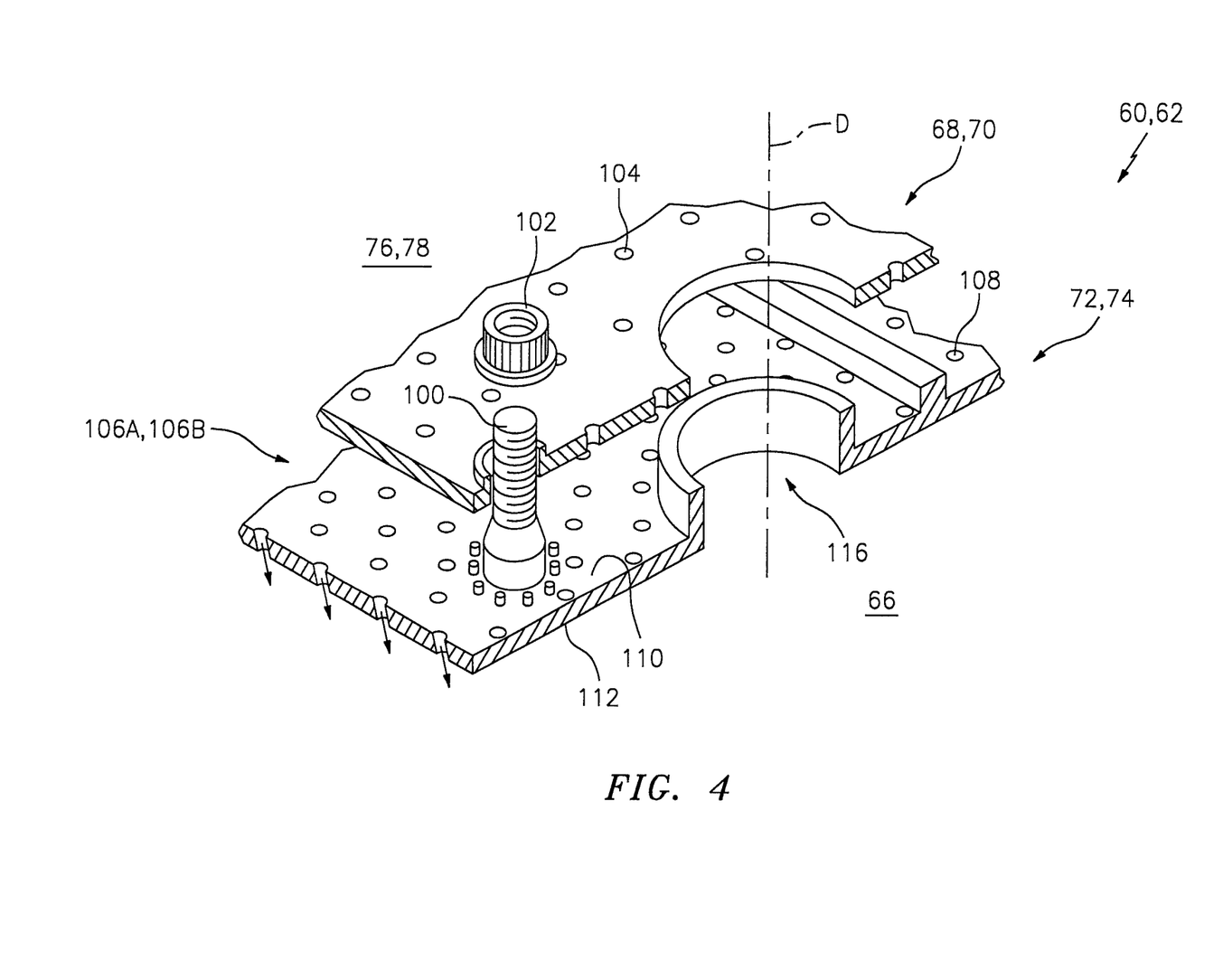
FIG. 4 is an exploded view of a liner assembly of a combustor.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106A, 106B formed in the respective wall assemblies 60, 62. The cooling impingement passages 104 are generally normal to the surface of the liner panels 72, 74. The air in the cavities 106A, 106B provides cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. As the effusion passages 108 are typically obliquely oriented, the film cooling air jets may enter the combustion chamber 66 with a directional component to essentially parallel the flame exposed surface of each liner panels 72, 74. The parallelism facilitates coalescence of the cooling air jets into a cooling film that hugs the flame exposed surfaces of the liner panels 72, 74. The effusion passages 108 may be generally oriented so that the cooling air discharged therefrom has both radial and axial directional components toward a downstream direction; however, the effusion passages 108 may alternatively or additionally be oriented so that the discharged cooling air has a circumferential directional component as well. Moreover, the cooling air discharged through the effusion passages 108 hugs the liner panels 72, 74 to form a cooling film rather than penetrating into the interior of the combustion chamber 66 and participating in the combustion process. Each wall assembly 60, 62, with combinations of impingement passages 104 and effusion passages 108, may be referred to as an Impingement Film Floatwall (IFF) assembly.

The effusion passages 108 allow the air to pass from the cavities 106A, 106B defined in part by a cold side 110 of the liner panels 72, 74 to a hot side 112 of the liner panels 72, 74 and thereby facilitate the formation of a relatively thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

Each of a multiple of dilution passages 116 penetrate through the respective support shells 68, 70 and liner panels 72, 74 along a common axis D. The dilution passages 116 are generally located downstream of the forward assembly 80 to quench the hot combustion gases within the combustion chamber 66 by direct supply of cooling air jets from the respective annular plenums 76, 78. The dilution passages 116 may also be described as quench jet passages; combustion passages; quench holes; combustion holes; or dilution holes.

Each of the bulkhead liner panels 98 are generally transverse to axis F (see FIG. 3) while the liner panels 72, 74 are generally parallel thereto. A generally rectilinear longitudinal section of the annular combustion chamber 66 is thereby defined for each of the multiple of fuel injectors 86 (FIG. 3).

Figure 5:
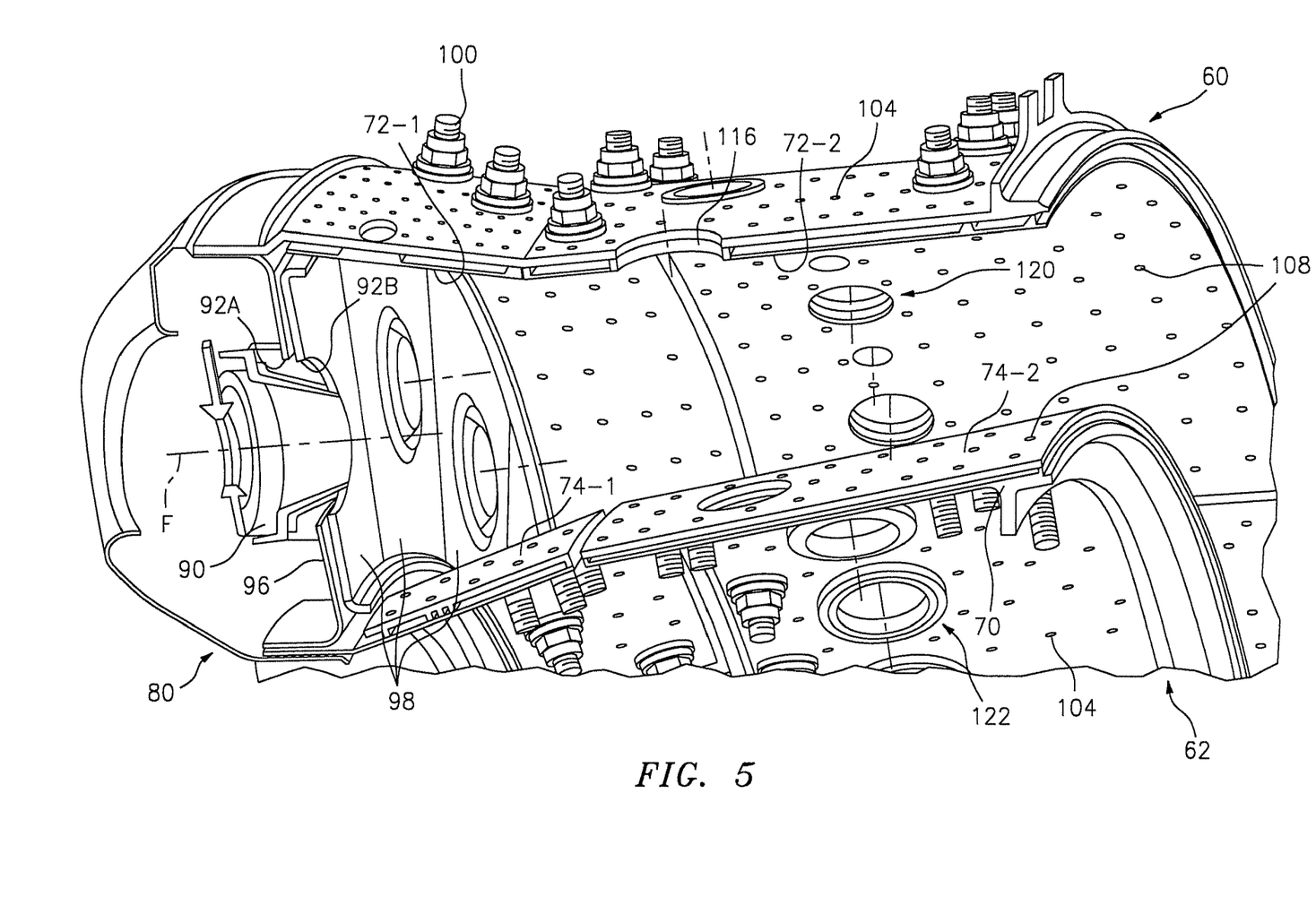
FIG. 5 is a perspective partial longitudinal sectional view of the combustor section.

With reference to FIG. 5, the bulkhead support shell 96 is generally annular and defines a multiple of swirler openings 92A, one each for each fuel injector 86/swirler 90 (see also FIG. 3). A multiple of bulkhead liner panels 98 are mounted to the bulkhead support shell 96. Each bulkhead liner panel 98 typically includes one swirler opening 92B that corresponds with the swirler opening 92A along the common axis F.

The outer combustor wall assembly 60 and the inner combustor wall assembly 62 each have a row 120, 122 of circumferentially distributed dilution passages 116 which penetrate therethrough. In the disclosed non-limiting embodiment, each row 120, 122 penetrates through its respective liner at about midway along an axial length of the respective wall assembly 60, 62, which corresponds to a location proximate a leading edge of each aft liner panel 72-2, 74-2. The rows 120, 122 of dilution passages 116 in respective outer and inner wall assemblies 60, 62 generally denotes the division of the combustion chamber into three combustion zones, a rich burn zone RB axially forward of the passages, a dilution or quench zone Q axially coincident with the dilution passages 116, and a lean burn zone LB axially aft of the passages.

Figure 6:
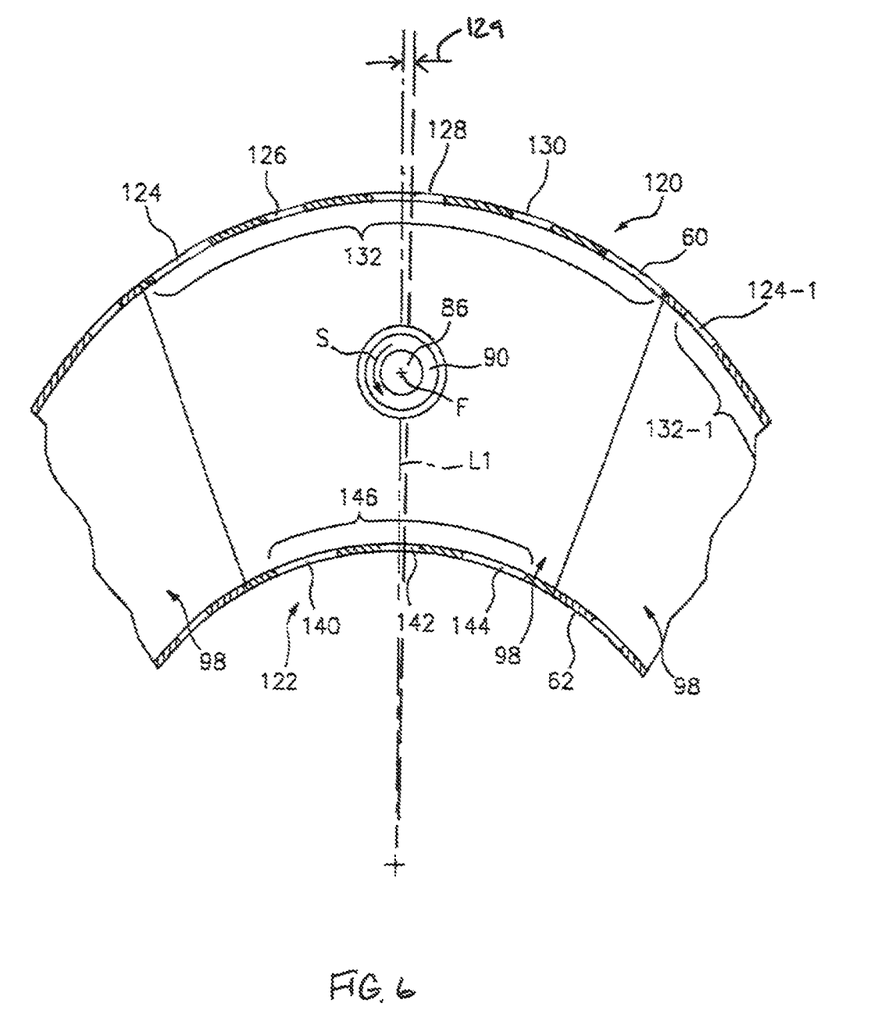
FIG. 6 is an aft looking forward view to show an inner and outer dilution passage pattern associated with each of a multiple of swirlers.

With reference to FIG. 6, the outer row 120 of dilution passages 116 in the outer combustor wall assembly 60 includes a multiple of outer passages 124, 126, 128, 130 that are arranged in a repeating pattern about a circumference of the outer combustor liner 60 to form an outer pattern 132. The patterns 132 are referred to herein as repeating quadruplets and passage 124-1 represents the first of the next outer pattern 132-1.

Figure 7A:
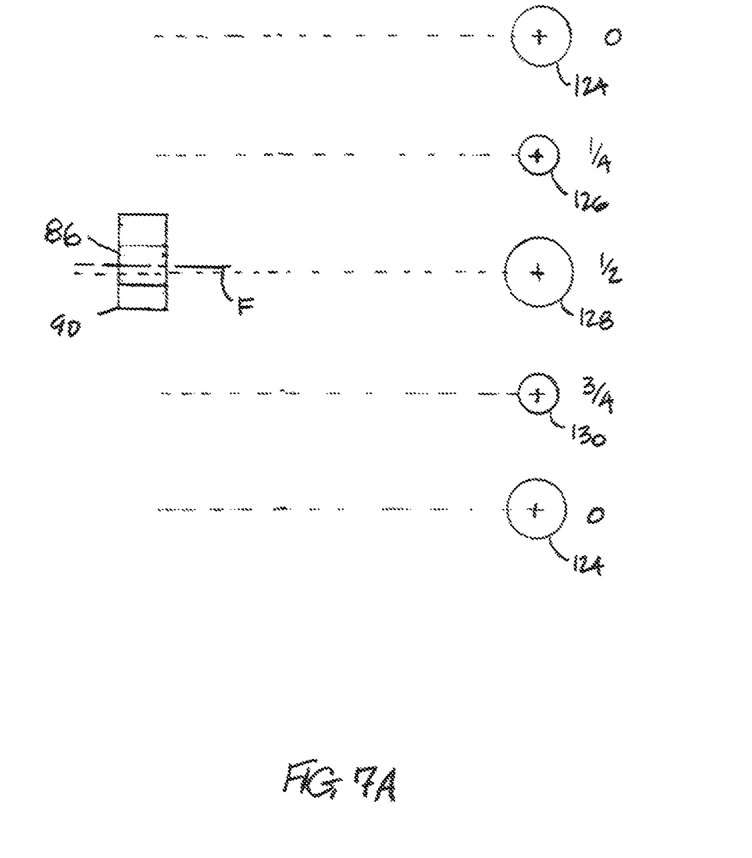
FIG. 7A is a schematic illustration depicting the outer dilution passage pattern relative to a fuel injector and a respective swirler.

With respect to a fuel injector along its respective pitch line L1, the first major outer air passage 124 is defined at about zero (0) pitch; the first minor outer air passage 126 is defined at about ¼ pitch; the second major outer air passage 128 is defined at about ½ pitch; and the second minor outer air passage 130 is defined at ¾ pitch; e.g., see FIG. 7A. The pattern then repeats commensurate with the number of swirlers 90, with the first major outer air passage 124-1 of the next pattern at about full pitch in this pattern and about zero (0) pitch of the next outer pattern 132-1. That is, zero (0) pitch and full pitch are midway between the associated swirlers 90 and may be referred to as the periodic passages while ½ pitch is generally aligned with the respective swirler 90. In other words, full pitch is the end of one pattern but is also the beginning of the next pattern, i.e., zero (0) pitch in a circumferential direction around axis A.

In this disclosed non-limiting embodiment, each outer pattern 132 is associated with, but circumferentially clocked (e.g., circumferentially offset) with respect to an associated one of the swirlers 90, thus, the number of patterns 132 through the outer wall assembly 60 is commensurate with the number of swirlers 90. In this disclosed non-limiting embodiment, the circumferentially clocked arrangement arranges the second major outer passage 128 by an angle 129 of about one (1) degree with respect to the axis F. Further, the second major outer passage 128 is clocked in a direction opposite the rotational direction (illustrated schematically by arrow S) provided by the swirler 90, e.g., the swirler 90 provides a counter clockwise rotating fuel-air mixture such that the second major outer passage 128 and thus the outer pattern 132 is clocked clockwise in this embodiment. In other words, each outer pattern 132 is arranged so that the second major outer passage 128 is clocked with respect to a fuel injector zero pitch line L1 along which one swirler 90 is located. That is, the four-passage pattern is clocked with respect to each associated fuel injector 86. To facilitate de-swirling of the fuel-air mixture from the upstream swirler 90.

Each of the outer passages 124, 126, 128, 130 may have a passage size different one from another. In this disclosed non-limiting embodiment, the passages 126, 130 are smaller than the passages 124, 128. That is, the passages 124, 128 may be referred to as major outer passages while the passages 126, 130 may be referred to as minor outer passages. Further, the passage 128 may be referred to as the primer major outer passage that is larger than passage 124.

Still further, the passages 126, 130 may be generally equivalent. It should be appreciated that other relationship and magnitudes will alternatively benefit herefrom.

The inner row 122 of dilution passages 116 in the inner combustor wall assembly 62 in this example includes an inner set of passages 140, 142, 144 that are arranged in repeating order about a circumference of the inner combustor liner 62 to form an inner pattern 146 associated with each swirler 90. The patterns 146 are referred to herein as repeating triplets.

Figure 7B:
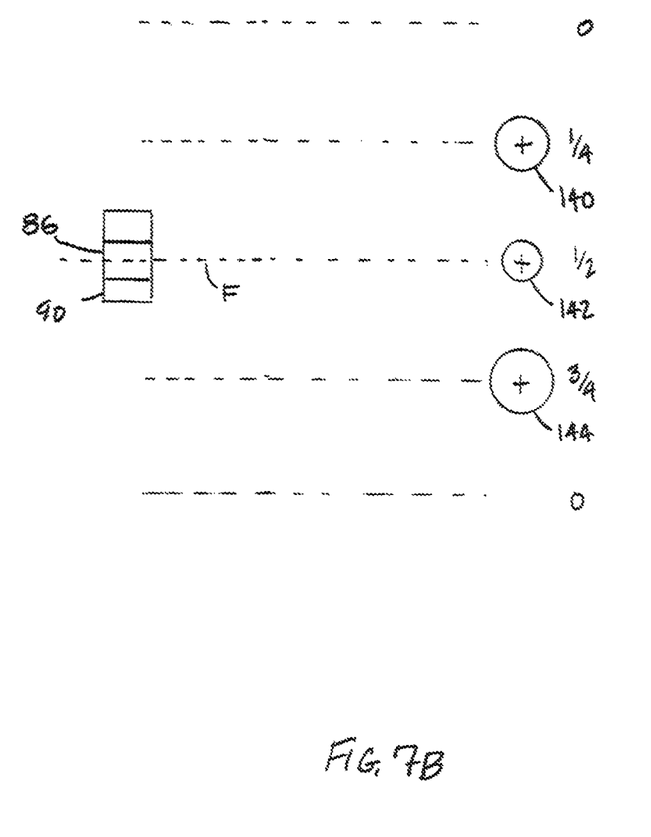
FIG. 7B is a schematic illustration depicting the inner dilution passage pattern relative to the fuel injector and the respective swirler.

With respect to the fuel injector zero pitch lines L1, the first major inner air passage 140 is defined at about ¼ pitch; the minor inner air passage 142 is defined at about ½ pitch; and the second major inner air passage 144 is defined at about ¾ pitch; e.g., see FIG. 7B. Although described at an approximate pitch location, the first major inner air passage 140 is directed between the first major outer air passage 124 and the first minor outer air passage 126; while the second major inner air passage 144 is directed between the second major outer air passage 128 and the second minor outer air passage 130. The inner pattern 146 then repeats commensurate with the number of swirlers 90 fuel injectors 86.

Each of the inner set of passages 140, 142, 144 in the pattern 146 may have a passage size different one from another. In this disclosed non-limiting embodiment, the second major inner air passage 144 is larger than the first major inner air passage 140 which is larger than the minor inner air passage 142.

In this disclosed non-limiting embodiment, a total volume of the outer passages 124, 126, 128, 130 is greater than a total volume of the inner passages 140, 142, 144. Further, in this disclosed non-limiting embodiment the diffusion passage 116 size in order from largest to smallest is: the second major outer air passage 128; the first major outer air passage 124; the second major inner air passage 144; the first major inner air passage 140; the first and second minor outer air passage 126, 130; and the minor inner air passage 142.

The patterns 132, 146 of diffusion passages 116 facilitates de-swirling of the air exiting the upstream swirlers 90 to provide a more thoroughly mixed combustion products flow which facilitates tailoring of the combustor exit temperatures and thereby increases durability life of the HPT. Thus, the net effect is to reduce the swirl and reduce NOx.

The axial location of the rows 120, 122 of air passages may be further selected to harmonize the competing considerations of the spatial temperature profile generated by the combustion products with prevention of excessive NOx formation in the rich burn zone. The rows 120, 122 are also positioned far enough aft to prevent the dilution air from being entrained into the fuel-air mixture immediately aft of the swirlers 90.

Evaluations using sophisticated computational fluid dynamics (CFD) techniques has shown the efficacy of the quench jet pattern which provides effective cooling to address gas temperature variations inside the combustor chamber 66; enhance cooling through flow distribution with heat transfer enhancement features while maintaining increased film coverage and effectiveness throughout the combustor chamber; improve combustor durability by optimum distribution of cooling circuits; and facilitate lower emissions and improved turbine section durability.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor for a turbine engine, comprising:
   a fuel injector;
   an inner liner panel with a plurality of inner dilution passages, the plurality of inner dilution passages including a first repeating pattern of a first major inner air passage, a minor inner air passage and a second major inner air passage, wherein the second major inner air passage is larger than the first major inner air passage, the first major inner air passage is larger than the minor inner air passage, and a first radius extends from an axial centerline of the turbine engine which passes through a center of the minor inner air passage and a center of the fuel injector; and
   an outer liner panel with a plurality of outer dilution passages opposite the inner liner panel, the plurality of outer dilution passages including a second repeating pattern of a first major outer air passage, a first minor outer air passage, a second major outer air passage and a second. minor outer air passage, wherein a second radius extends from. the axial centerline of the turbine engine which passes through a center of one of the plurality of outer dilution passages, and the second radius is offset from the first radius by one degree.

2. The combustor as recited in claim 1, wherein the first major inner air passage is located at ¼ pitch with respect to a pitch line of the fuel injector.

3. The combustor as recited in claim 1, wherein the first major inner air passage is located at ¼ pitch with respect to a pitch line of the fuel injector, the minor inner air passage is located at ½ pitch with respect to the pitch line of the fuel injector, and the second major inner air passage is defined at ¾ pitch with respect to the pitch line of the fuel injector for the first repeating pattern of inner passages with respect to each of a plurality of swirlers.

4. The combustor as recited in claim 1, wherein the first major inner air passage is located at ¼ pitch with respect to a pitch line of the fuel injector, the minor inner air passage is located at ½ pitch with respect to the pitch line of the fuel injector, and the second major inner air passage is defined at ¾ pitch with respect to the pitch line of the fuel injector.

5. The combustor as recited in claim 1, wherein the first major outer air passage is located at zero (0) pitch which is coincident with the second radius, the first minor outer air passage is located at ¼ pitch with respect to the second radius, the second major outer air passage is located at ½ pitch with respect to the second radius, and the second minor outer air passage is defined at ¾ pitch with respect to the second radius.

6. The combustor as recited in claim 1, wherein the second radius is angularly offset from the first radius by one degree in a circumferential direction that is opposite to a circumferential direction of swirl provided by the upstream swifter.

7. The combustor as recited in claim 1, wherein the second major outer air passage is the one of the plurality of outer dilution passages.

8. The combustor as recited in claim 1, wherein the plurality of outer dilution passages collectively define a first area that is larger than a second area collectively defined by the plurality of inner dilution passages.

9. A combustor for a turbine engine, comprising:
a fuel injector;
an outer liner panel with a plurality of outer dilution passages, the plurality of outer dilution passages including a first repeating pattern of a first major outer air passage, a first minor outer air passage, a second major outer air passage and a second minor outer air passage, wherein the first major outer air passage is larger than the first minor outer air passage and the second minor outer air passage, and wherein the second major outer air passage is larger than the first minor outer air passage and the second minor outer air passage; and an inner liner panel with a plurality of inner dilution passages opposite the outer liner panel, wherein the plurality of dilution passages includes a second repeating pattern of a first major inner air passage, a minor inner air passage and a second major inner air passage, and a first radius extends from an axial centerline of the turbine engine which passes through a center of the minor inner air passage and a center of the fuel injector;

wherein a second radius extends from the axial centerline of the turbine engine which passes through a center of one of the plurality of outer dilution passages, and the second radius is offset from the first radius by one degree; and wherein the plurality of outer dilution passages collectively define a first area that is larger than a second area collectively defined by the plurality of inner dilution passages.

10. The combustor as recited in claim 9, wherein the first major outer air passage is located at zero (0) pitch which is coincident with the second radius, the first minor outer air passage is located at ¼ pitch with respect to the second radius, the second major outer air passage is located at ½ pitch with respect to the second radius and the second minor outer air passage is defined at ¾ pitch with respect to the second radius.

11. The combustor as recited in claim 9, wherein the plurality of outer dilution passages are clocked in a direction opposite to a direction a swirl provided by the upstream swirler.

12. The combustor as recited in claim 9, wherein the second major outer air passage is larger than the first major outer air passage, and the first minor outer air passage and the second minor outer air passage are equal in size.

13. The combustor as recited in claim 9, wherein the first major inner air passage is located at ¼ pitch with respect to a pitch line of the fuel injector, the minor inner air passage is located at ½ pitch with respect to the pitch line of the fuel injector, and the second major inner air passage is defined at ¾ pitch with respect to the pitch line of the fuel injector, and wherein the second major inner air passage is larger than the first major inner air passage.

\* \* \* \* \*

UNITED STATES PATENT AND TRADEMARK OFFICE
CERTIFICATE OF CORRECTION

PATENT NO. : 10,816,206 B2
APPLICATION NO. : 15/025808
DATED : October 27, 2020
INVENTOR(S) : Moura et al.

Page 1 of 1

It is certified that error appears in the above-identified patent and that said Letters Patent is hereby corrected as shown below:

In the Claims

Column 11, Line 23, please delete "swifter" and insert --swirler--

Signed and Sealed this
Eighth Day of December, 2020

Andrei Iancu
*Director of the United States Patent and Trademark Office*